United States Patent Office 2,714,256
Patented Aug. 2, 1955

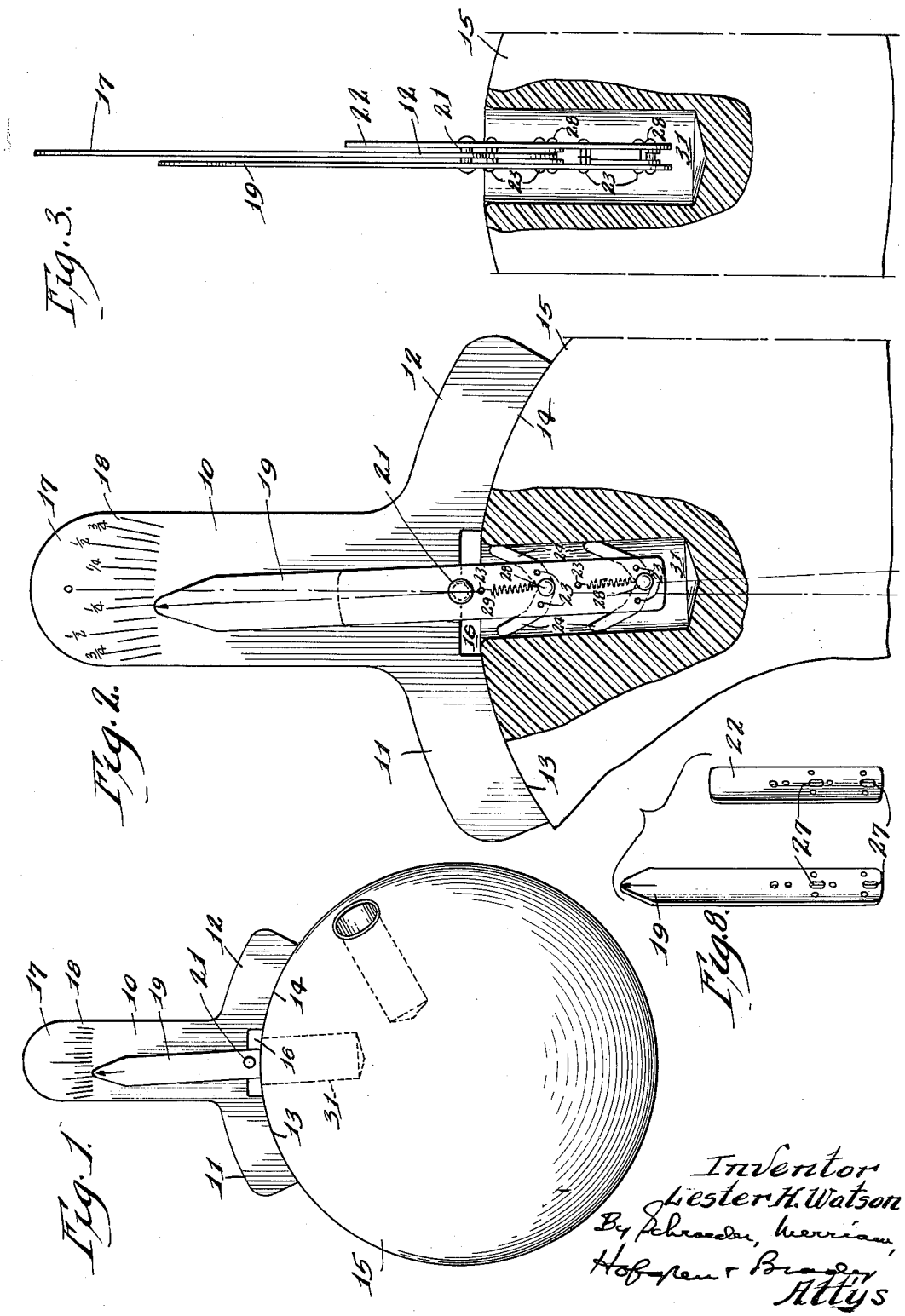

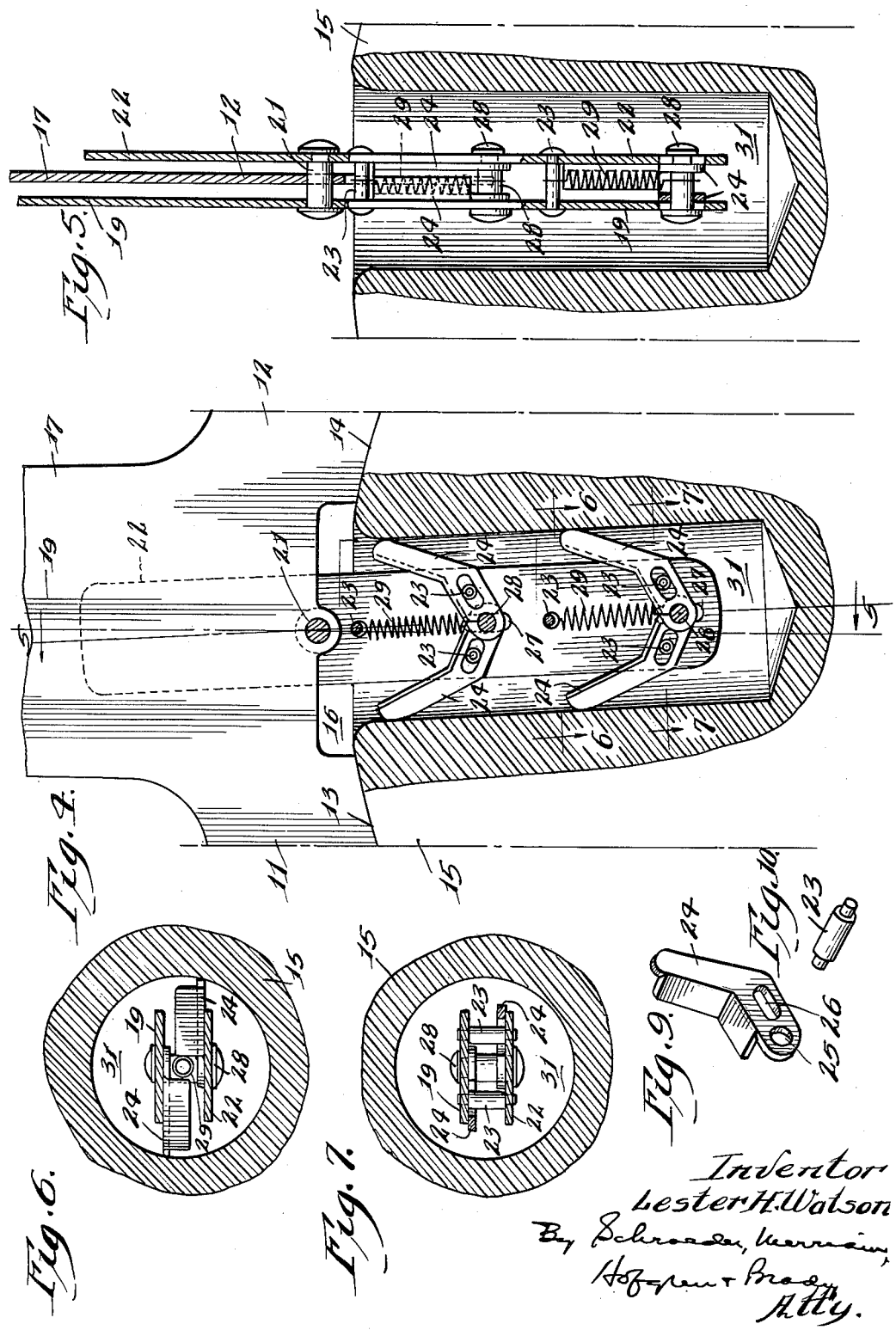

2,714,256

PITCH INDICATOR FOR BOWLING BALL BORES

Lester H. Watson, Affton, Mo., assignor to The Brunswick-Balke-Collender Company, a corporation of Delaware Application February 15, 1951, Serial No. 211,054

4 Claims. (Cl. 33—174)

This invention relates to a device for measuring the pitch of a bore hole, and more particularly to a device which will measure the pitch of a bowling ball finger hole.

It is a general object of this invention to produce a simple and accurate pitch indicator for measuring the angle of a bore.

It is a more specific object of this invention to produce a device for measuring the pitch of a bowling ball finger hole in which a pointer arm inserted in the hole has means for automatically centering the pointer arm in the hole.

A further object of this invention is to produce a pitch indicator for a bowling ball finger hole in which a three-forked flat member has inverse arcuate surfaces around the perimeter of two of the forks adapted to engage the spherical surface of a bowling ball and center a pivoted pointer arm over a finger hole; one end of the pointer arm indicating graduations on a scale positioned at the outer end of the third fork and the other end of the pointer arm having at least one spring biased wall contacting member in which uniform spring tension is maintained on two outwardly extending wall contacting arms having freedom of movement to accommodate different sizes of bores.

Other and further objects of this invention will be apparent from the accompanying description and drawings, in which:

Fig. 1 is a view of a bowling ball having the device of this invention in position for measuring the pitch of a finger hole;

Fig. 2 is an enlarged broken section of the indicator and finger hole portion of Fig. 1;

Fig. 3 is a side elevation, partly in section, of the apparatus shown in Fig. 2;

Fig. 4 is an enlarged view similar to Fig. 2 of the pointer arm and its centering means;

Fig. 5 is a sectional view taken along the lines 5—5 of Fig. 4;

Fig. 6 is a sectional view taken along the lines 6—6 of Fig. 4;

Fig. 7 is a sectional view taken along the lines 7—7 of Fig. 4;

Fig. 8 is an exploded perspective view of the pointer arm and its backing piece;

Fig. 9 is a perspective view of one of the wall contact arms which center the pointer arm in a bore; and, Fig. 10 is a perspective view of one of the rivets which spaces the pointer arm from its backing member and also serves to anchor the biasing springs for the wall contacting arms.

While my invention is susceptible of embodiment in many different forms, I have shown in the drawings and will herein describe one specific embodiment, with the understanding that the present disclosure is to be considered as an exemplification of the principles of the invention and is not intended to limit the invention to the embodiment illustrated. The scope of the invention will be pointed out in the appended claims.

Bowling balls are produced in a variety of weights and finger hole positions and it is desirable that each bowler be equipped with a ball not only of a weight most suited to him but also having finger grip holes most suited to his grip from the standpoint of spacing and pitch. Devices have been made which can determine the preferred spacing and pitch of the finger grip holes. Such devices usually have a surface which is spherical like a bowling ball and may include a finger hole which may be adjusted to a variety of positions with respect to the surface of the ball and the finger hole itself may be set to a variety of pitches. Such a device is disclosed in my copending application Ser. No. 180,112, filed August 18, 1950.

When the most suitable spacing and pitch of the grip holes for any particular bowler has once been indicated on a test ball, it is necessary to determine this spacing and pitch in order that a ball blank may be bored to reproduce the spacing and pitch of the grip holes of the test device. This invention comprises an apparatus which will measure the pitch.

Referring to Figs. 1 and 2, a gage body consisting of a three-forked flat member indicated generally at 10 has two of its forks 11 and 12 equipped with inverse arcuate surfaces 13 and 14 adapted to engage the spherical surface of a bowling ball 15. There is a gap indicated at 16 between the surfaces of the forks 11 and 12 and this gap is symmetrically spaced with respect to a third fork 17. The center of the gap 16 is on a radial line from the center of the bowling ball 15 and the center of the fork 17, the two forks 11 and 12 having symmetrical configurations with respect to this center line.

On a spherical surface, the center of the fork 17 will always be along a radial line of the sphere. If the device is applied to a flat surface the center of the fork 17 will always be perpendicular to the flat surface.

An indicator scale 18 is imprinted near the outer tip of the fork 17. The scale 18 cooperates with a pitch indicator or pointer arm 19 to indicate the pitch of a bore in a manner to be more fully described hereinafter. The pointer arm 19 is pivoted at the base of the fork 17 around a pivot pin 21 which is located along the center line of the fork 17. The pointer arm 19 has a backing member 22 which is coextensive with the bottom portion of the pointer arm 19. The gage body 10 is retained between the pointer arm 19 and backing member 22. Spacing between the pointer arm 19 and backing member 22 is maintained by a plurality of rivets 23 which also serve to position some additional parts of the pointer arm. In the space between the pointer arm 19 and the backing member 22, two sets of wall contacting members are located. Each of these wall contacting members consists of a pair of elongated fingers 24 adapted to contact the walls of a bore. Each elongated finger 24 has a circular aperture 25 (Fig. 9) and an elongated cam slot 26. Each finger 24 has a pivot pin 28 extending through the aperture 25 and the cam slots 27 in the pointer arm 19 and backing member 22. The elongated fingers 24 extend out in opposite directions as shown in Figures 2, 4, 6 and 7 and the fingers are slidably mounted with respect to the rivets 23 extending through the cam slots 26 and the pivot pins 28 which have freedom of a short vertical movement in the cam slots 27. The biasing effect of the spring 29 forces the elongated fingers 24 outwardly so that they will contact the walls of bowling ball finger holes or similar bores. In any one set of wall contacting members the elongated fingers 24 will be positioned the same distance outfardly with respect to the pointer arm 19 since if one of the fingers 24 is fixed in position the companion finger 24 will be forced into the comparable position on the other side of the pointer arm 19. Thus, when the two elongated fingers 24 of any set of wall contacting members contact the walls of a bore, the pointer arm 19 will be forced into a position in the center of the bore. The operation of the device in measuring the pitch of a bore indicated at 31 will now be described.

The pitch indicator is first lined up so that the gap 16 is directly over the bore 31. The center of the gap 16 being over the center of the bore. Since the gap 16 is designed to be greater in width than any bore to be measured, the bore may be centered by ascertaining that the distance from the edge of the gap 16 to the edge of the bore 31 is the same on both sides. The bottom portion of the pointer arm 19 is thrust into the bore 31. The elongated arms 24 contact the walls of the bore 31 and are pressed inward against the bias of the springs 29. As soon as the surfaces 13 and 14 contact the ball 15 and the gap 16 is centered with respect to the hole 31 the pointer arm 19 will point slightly off the center position as shown in the various figures provided the bore axis does not lie along a radial line of the ball 15. Since the pointer arm 19 is lined up with the axis of the bore and the fork 17 is lined up with a radial line of the ball 15, the indicator 18 now shows the difference in spacing between the bore 31 and ball 15, or in other words, the pitch of the bore 31. The graduated scale 18 may be expressed in terms of an angle or in terms of the scalar displacement of the base of the bore 31 with respect to the center of the ball 15. Since a straight line is determined by two points, the center lines of the hole and indicator will coincide. This enables a similar bore to be made on another bowling ball.

If the bore should have a side pitch the gage body is rotated 90° and the readings again taken as before. These two positions of the gage will then give a reading of the forward or reverse pitch of the bore as well as the side pitch thereof.

The device illustrated may also be used to indicate the pitch of a hole bored in a flat surface. However, where the particular embodiment illustrated is used for this purpose, an error is introduced due to the fact that the pivot 21 is displaced some distance from the surface of the work piece. In order to obtain absolute accuracy it is necessary that the pivot 21 be in the surface plane of the work piece. Thus, even in the case of the bowling ball 15 a slight error is present in the embodiment illustrated since the pivot 21 is displaced slightly from the surface of the ball. However, this error is so slight as to make no difference. In the case of a flat work piece, the error can be reduced by providing the forks 11 and 12 with flat surfaces 13 and 14 extending outward at a 90° angle from the fork 17.

I claim:
1. A pitch indicator for a bowling ball finger hole comprising: a three-forked flat gage body, the first and second forks having cooperating inverse arcuate surfaces adapted to make contact with the spherical surface of a bowling ball, said arcuate surfaces having a gap therebetween, said surfaces and gap being symmetrically spaced with respect to the third fork, the third fork being adapted to extend outwardly with its center along a radial line of said ball; an indicator scale near the tip of said third fork, said scale having a zero reading along a center line of the surface of said third fork; a pointer arm pivoted at the center of the base of said third fork, said pointer arm having a tip adapted to indicate a reading on said indicator scale and a bottom end adapted for extension into a bowling ball finger hole; and two sets of wall contacting members at the bottom end of said pointer arm, each set of wall contacting members consisting of a pair of elongated fingers which are connected at one end to a pivot which has free vertical movement for a short distance along the center of said pointer arm and which are slidably connected to said pointer arm at points slightly displaced from said pivot, said pivot being vertically biased by a spring whereby said elongated fingers are forced outwardly and act to center said pointer arm with respect to any surfaces encountered by said arms.

2. A pitch indicator for a bowling ball finger hole comprising: a three-forked flat gage body, the first and second forks having cooperating inverse arcuate surfaces adapted to make contact with the spherical surface of a bowling ball, and the third fork adapted to extend outwardly along a radial line of said ball; an indicator scale near the tip of said third fork, said scale having a zero reading along a center line of said third fork; a pointer arm pivoted at the center of the base of said third fork, said pointer arm having a tip adapted to indicate a reading on said indicator scale and a bottom end adapted for extension into a bowling ball finger hole, said bottom end having spaced vertical slots therein; and two sets of wall contacting members pivotally attached along a center line of the bottom end of said pointer arm and spring-biased outwardly from said pointer arm, the pivotal attachment between the wall contacting members of each set being slidable in their respective vertical slots, said wall contacting members serving to line up said pointer arm along the axis of the finger hole undergoing measurement.

3. A pitch indicator for a bore in a spherical surface comprising: a gage body having at least two points for engaging a spherical surface whereby a center line of said gage body is lined up with a radial line of said spherical surface; a pointer arm pivoted at the end of said gage body nearest said two points, the pivot point for said pointer arm being positioned on said center line, said pointer arm having one end adapted to extend into a bore and provided with cam slots and the other end adapted to cooperate with the gage body to indicate the pitch of the bore; and two pairs of wall contacting members pivotally attached to the end of said pointer arm which is adapted to extend into said bore and spring-biased outwardly from said pointer arm, each pair of wall contacting members consisting of two elongated fingers pivoted together and having their pivotal connections slidable for a short distance vertically along their respective cam slots in said pointer arm, said elongated fingers being disposed beyond the margin of said pointer arm and extending upward in the direction of the pivot of said pointer arm and away from said pointer arm whereby said elongated fingers contact the sides of a bore and position said pointer arm with its center line parallel with the axis of said bore.

4. Apparatus of the character claimed in claim 3 in which said pointer arm has a backing member and said wall contacting members pivot on spacer rivets connecting said backing member to said pointer arm.

References Cited in the file of this patent
UNITED STATES PATENTS

| | | |
|---|---|---|
| 714,367 | Demarty | Nov. 25, 1902 |
| 1,411,911 | Desbains | Apr. 4, 1922 |
| 2,121,614 | Stark | June 21, 1938 |
| 2,134,262 | Phillips | Oct. 25, 1938 |
| 2,546,532 | Wade | Mar. 27, 1951 |